A. CLARKE'S
ADJUSTABLE UMBRELLA HOLDER.
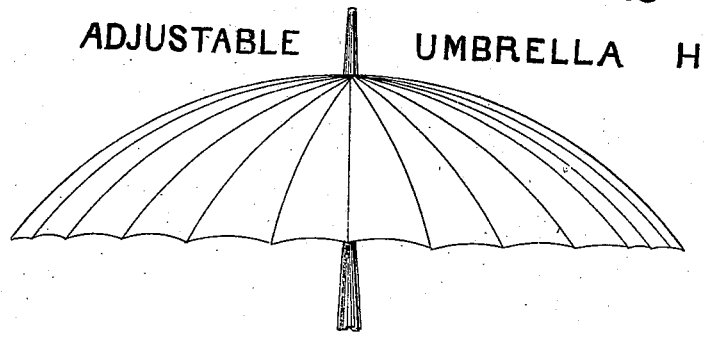
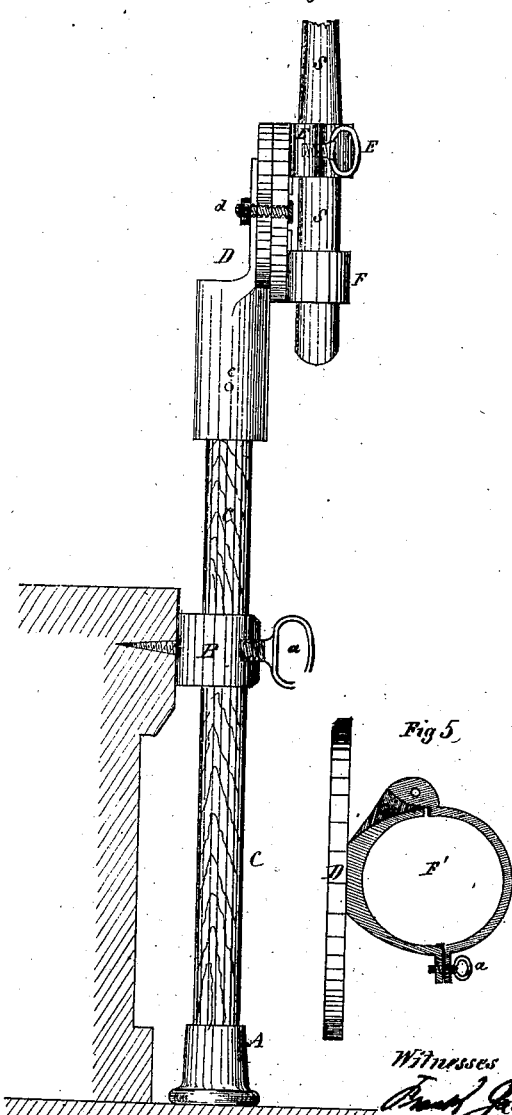
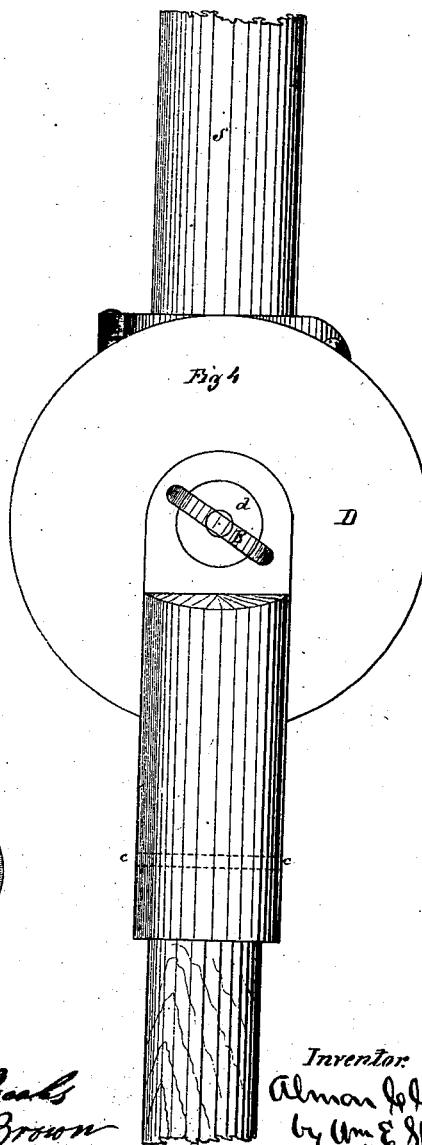
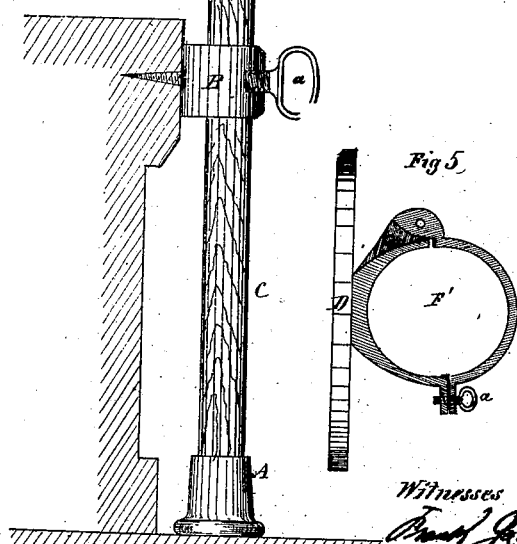
Witnesses
Inventor:
Almon Clarke
by Wm. E. Spencer
Attorney

United States Patent Office.

JAMES FREEMAN CLARKE, OF WEST ROXBURY, MASSACHUSETTS.

IMPROVEMENT IN ASTRONOMICAL LANTERNS.

Specification forming part of Letters Patent No. 110,435, dated December 27, 1870.

*To all whom it may concern:*

Be it known that I, JAMES FREEMAN CLARKE, of West Roxbury, in the county of Norfolk and State of Massachusetts, have invented an Astronomical Lantern, of which the following is a full, clear, and exact description, reference being had to the accompanying drawings, making part of this specification, in which—

Figure 1 is a perspective view of my astronomical lantern. Fig. 2 is a vertical section through the center of the same.

My invention has for its object to facilitate the study of astronomy by enabling the observer to instantly compare the map of a constellation or cluster of stars with the constellation or cluster itself, thus avoiding the necessity of going into the house to examine the map, which is objectionable, as the student, in passing from the map to a position where he can view the stars, or from that position to the map, is liable to forget the appearance of either the map or stars; and my invention consists in a lantern provided with one or more perforated maps of the heavens or portion thereof, the position of the various stars and their relative magnitude being indicated by the perforations through which the light from the lantern is seen, and thus, when the lantern is taken outside the house, the observer is enabled to make an instantaneous comparison of the map of the stars with the stars themselves.

To enable others skilled in the art to understand and use my invention, I will proceed to describe the manner in which I have carried it out.

In the said drawings, A represents a lantern of rectangular form, within which is a socket, *b*, for a candle; or a lamp may be substituted for the candle, if preferred. This lantern, which is provided with a handle, *c*, by which it may be held up, is constructed so as to be dark, except on one side, which is formed of a plate of ground glass, *d*, and on this side the lantern is provided with grooves *e* for the reception of one of a series of removable slides, B, upon which are delineated maps of the constellations or portions of the heavens. These slides B are formed of any suitable semi-transparent or opaque material, and at each star is a perforation, *f*, the size of which is varied to correspond with that of the star, and through these perforations the light passes from the interior of the lantern, and the positions of the various stars and their relative magnitudes are thus readily indicated. The slide containing the desired constellation or portion of the heavens having been inserted within the grooves *e*, and the lantern lighted, it is held up in one hand and the illuminated slide or map B compared with the actual constellation until the form of the latter has become familiar to the observer, who is thus enabled to remain outside and avoid the delay and annoyance heretofore experienced in going from the position where the stars are visible to the map, and again back to find the constellation, during which interval the student is liable to forget the appearance of either the map or the stars.

Instead of removable slides being employed, a map of the entire visible heavens or any portion thereof may be permanently fitted to the side of the lantern; or, if found desirable, the map may be so constructed and applied as to admit of being revolved.

C is a box or receptacle, formed on one side of the lantern, for containing the various slides, which may be readily inserted in place when required.

What I claim as of my invention, and desire to secure by Letters Patent, is—

1. The within-described astronomical lantern, provided with one or more perforated maps of the heavens or portion thereof, operating substantially in the manner and for the purpose set forth.

2. In combination with the above, the box or receptacle C, as and for the purpose described.

Witness my hand this 29th day of October, A. D. 1870.

JAMES FREEMAN CLARKE.

Witnesses:
   P. E. TESCHEMACHER,
   N. W. STEARNS.